United States Patent
Kusserow et al.

(10) Patent No.: US 11,365,096 B2
(45) Date of Patent: Jun. 21, 2022

(54) CONTINUOUSLY CONVEYING PASSENGER TRANSPORT SYSTEM, WHICH CAN BE WALKED ON, HAVING A CHARGING POSSIBILITY FOR MOBILE DEVICES

(71) Applicant: INVENTIO AG, Hergiswil (CH)

(72) Inventors: Martin Kusserow, Lucerne (CH); Zack Zhu, Baar (CH); Thomas Novacek, Schwechat (AT)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 16/646,950

(22) PCT Filed: Aug. 29, 2018

(86) PCT No.: PCT/EP2018/073223
§ 371 (c)(1),
(2) Date: Mar. 12, 2020

(87) PCT Pub. No.: WO2019/052809
PCT Pub. Date: Mar. 21, 2019

(65) Prior Publication Data
US 2020/0270101 A1 Aug. 27, 2020

(30) Foreign Application Priority Data
Sep. 13, 2017 (EP) ..................... 17190933

(51) Int. Cl.
*B66B 23/24* (2006.01)
*B66B 31/02* (2006.01)
(Continued)

(52) U.S. Cl.
CPC .............. *B66B 23/24* (2013.01); *B66B 31/02* (2013.01); *B29L 2031/709* (2013.01);
(Continued)

(58) Field of Classification Search
CPC ......... B66B 23/24; B66B 23/20; B66B 31/02; B66B 31/709; B66B 31/00; B66B 21/02; B66B 25/00; B29L 2031/709
See application file for complete search history.

(56) References Cited

U.S. PATENT DOCUMENTS

| 6,866,125 | B2 * | 3/2005 | Ball .................... B66B 23/24 187/391 |
| 2002/0036121 | A1 | 3/2002 | Ball et al. |

(Continued)

FOREIGN PATENT DOCUMENTS

| CN | 102408049 A | 4/2012 |
| CN | 203048372 U | 7/2013 |

(Continued)

OTHER PUBLICATIONS

International Search Report for International Application No. PCT/EP2018/073223 dated Nov. 21, 2018.

*Primary Examiner* — William R Harp
(74) *Attorney, Agent, or Firm* — Knobbe Martens Olson & Bear LLP (57) ABSTRACT

The present application relates to a continuously conveying passenger transport system which can be walked on and is designed as an escalator or moving walkway and a mobile device charging device for wirelessly electrically charging at least one mobile device during a passenger transport.

20 Claims, 2 Drawing Sheets

(51) Int. Cl.
*B29L 31/00* (2006.01)
*B66B 21/02* (2006.01)
*B66B 23/20* (2006.01)
*B66B 25/00* (2006.01)

(52) U.S. Cl.
CPC ............... *B66B 21/02* (2013.01); *B66B 23/20* (2013.01); *B66B 25/00* (2013.01)

(56) References Cited

U.S. PATENT DOCUMENTS

2013/0234481 A1* 9/2013 Johnson .................. H02J 7/025
297/217.3
2015/0009015 A1* 1/2015 Nakata .................... B66B 23/24
340/10.1

FOREIGN PATENT DOCUMENTS

| JP | 2006027828 A | 2/2006 |
| JP | 2010154570 | 7/2010 |

* cited by examiner

CONTINUOUSLY CONVEYING PASSENGER TRANSPORT SYSTEM, WHICH CAN BE WALKED ON, HAVING A CHARGING POSSIBILITY FOR MOBILE DEVICES

TECHNICAL FIELD

The present application relates to a continuously conveying passenger transport system, which can be walked on and is designed as an escalator or moving walkway.

SUMMARY

Escalators and moving walkways are passenger transport systems that are used to carry standing passengers on stepping units such as treads or pallets within buildings or structures.

An escalator or a moving walkway has a handrail on both sides, which is substantially synchronized with a driving movement of the escalator or the moving walkway. According to regulations, passengers have to hold onto one of the handrails of the escalator or the moving walkway, for example, to stay in balance and not to fall. However, many passengers ignore the handrails and keep their hands so far away from one of the handrails that they have no chance to grab the handrail when they lose their balance. Passengers may, for example, lose their balance if they are unexpectedly shoved by another passenger, or if the escalator or moving walkway stops abruptly. The transitions between the horizontal sections of the entry and exit areas on escalators and the oblique section between them also hold a certain risk of falling when the steps move vertically to each other and the passenger has placed his toes on the upper step near the edge of the stairs.

US 2002/0036121 A1 describes an illumination system for illuminating a handrail of an escalator. The lighting can highlight the handrail.

There may, for example, be a need for an incentive for passengers to grab the handrail or at least keep one hand near the handrail.

Such a need can be met by a continuously conveying passenger transport system that can be walked on described in this application.

Advantageous embodiments are provided throughout this disclosure.

According to one aspect, a continuously conveying passenger transport system that can be walked on is proposed, which is designed as an escalator or moving walkway. The passenger transport system comprises a mobile device charging device. By means of this mobile device charging device, an energy storage of at least one mobile device can be charged during a passenger transport. As described in the present application, therefore, energy, preferably electrical energy, can thus be supplied to the energy storage of a mobile device during a passenger transport. However, this does not mean that the energy storage of the mobile device must be fully charged after traveling on the passenger transport system equipped as described herein.

Possible features and advantages of embodiments of the application may be considered, inter alia, and without limiting the application, as being based on the principles and findings described below.

Many passengers of passenger transport systems almost exclusively pay attention to their mobile device, such as their Smartphone. As a result, the mobile device occupies a hand which otherwise could grip a handrail in the event of a loss of balance on the passenger transport system. In addition, the ability of the passenger in question to perceive his surroundings is significantly limited.

In the approach presented here, a charging option for charging the mobile device while on the passenger transport system is offered in order to use the travel time in a useful manner. To charge, however, it may be necessary to place the mobile device near the charging facility or in a charging zone. Since the mobile device is held in the hand of the passenger or since the hand of the passenger is not far from the mobile device placed in the charging zone, it is possible to influence where the hand of the passenger is placed without instructions or prohibitions. The passenger will voluntarily place at least one hand in the charging zone. If the charging zone is arranged in the area of an area so as to hold on, it can be quickly accessed by the passenger when needed. The charging incentive can thus be exploited to influence the position of the passenger's hand.

Especially with respect to escalators and moving walkways, it is advantageous to arrange the charging zone in the area of handrails. Thus, the charging option creates an incentive to draw attention to the handrail since there is an advantage in placing the mobile device and thus the hand holding the mobile device close to the handrail or even on the handrail.

Possible details of embodiments of the passenger transport system proposed herein are described below.

A continuously conveying passenger transport system can be entered at any time via an entry area and exited via an exit area. The passenger transport system can be used without waiting for a departure time of a means of transport of the passenger transport system. The passenger transport system transports persons or passengers at a transport speed of the passenger transport system from the entry area to the exit area. A line forms, if, at a given time, more people want to be transported than the passenger transport system can handle. A moving staircase can be called an escalator. A moving sidewalk can be called a moving walkway. Passengers can influence a resulting movement speed by moving themselves on the escalator and the moving walkway.

The energy transfer between the mobile device charging device and the mobile device can take place via electrically conductive contact points, with the corresponding contact points present on a surface of the handrail and on the mobile device. The energy transfer carried out by the contact points is very safe to use because the contact points do not represent wires with connectors in the traditional sense. These would be a hindrance in particular when leaving the passenger transport device.

One embodiment of a mobile device charging device is designed to wirelessly charge the energy storages of mobile terminals or mobile devices, such as tablets or smartphones. Wireless charging can be understood as an energy transfer to the mobile device which manages without a wire connection between the mobile device charging device and the mobile device. In particular, the mobile device does not have to be in a direct, wire-connected contact with the mobile device charging device. Optionally, there may not have to be a mechanical contact between the mobile device and the mobile device charging device. Without mechanical contact, the energy transfer takes place in a contactless and thus also wireless manner.

The mobile device charging device may be arranged in the vicinity of a handrail of the passenger transport system. For example, as detailed below, the mobile device charging device may be located on the handrail or on a guiderail that guides this handrail. Alternatively, a charging zone may be arranged parallel to the handrail.

A transmitter device of the mobile device charging device can be integrated in at least one handrail assembly of the passenger transport system. The handrail assembly may include a static handrail guide and a mobile handrail rotatably arranged around the handrail guide. The transmitter device is configured to provide a charging zone for wirelessly transmitting power to the mobile device in the surroundings of the handrail.

A charging zone around the handrail encourages passengers to hold their mobile near the handrail or to place it on the handrail. Thus, the holding hand is close to the handrail should the passenger lose his balance or be pushed. A charging zone is an area where wireless charging is possible. A charging area can be activated in the charging zone, depending on the presence of a mobile device.

The transmitter device can be integrated in the static handrail guide. The mobile handrail can be rotatably arranged guided on the handrail guide.

The transmitter device can be arranged in a static, that is, in a stationary manner. This may render moving parts that could wear out unnecessary. It is easy to electrically contact the transmitter as well. The transmitter device can be arranged, for example, below the handrail. Due to the fixed arrangement below the mobile handrail, transmitters may be required, in some embodiments, only along a tangible length of the handrail. The handrail can protect the transmitter device from environmental influences. The handrail must be designed so that it can penetrate the energy emitted by the transmitter. If necessary, for example, the usually metal tension members of the handrail such as stranded wire, would have to be replaced by non-conductive tension members made of synthetic fibers.

At least one charging area for each mobile device can be movable along the charging zone at a transport speed of the passenger transport system.

The transmitter device can form spatially limited charging areas. Since the passenger is to be encouraged to stand on the moving walkway or the escalator and not to walk, the charging area can be moved as fast as the pallets of the moving walkway or the steps of the escalator.

Alternatively, a charging area may also follow an actual moving speed of the mobile device. In this case, the charging area is formed at the most energetically favorable location so that the mobile device can be charged efficiently. The movement of the charging anus can be regulated electronically.

The transmitter device can be integrated in the handrail of the handrail assembly.

Due to the arrangement in the handrail, the transmitter device is moved at the transport speed of the passenger transport system. Charging areas can thus be formed at fixed positions relative to the handrail. Thus, each charging area is moved in the transport direction at the transport speed of the passenger transport system. The charging zone can be divided into subzones. Sections of the handrail without a charging possibility may be located between the subzones. Not many control electronics are needed, since the transmitter device must be moved at the transport speed.

A power supply device for supplying the transmitter device arranged in the handrail may be integrated into the static handrail guide and comprise at least one energy transfer element that is in contact with the handrail.

A power supply device may be, for example, a power supply unit. The energy supply device can provide an electrical voltage intended for the transmitter device and/or limit an electrical current flow to a maximum current intended for the transmitter device. A contacting energy transfer element may be, for example, a contact roller or a sliding contact. The contacting energy transfer element can contact a circumferential contact path of the handrail. The contact track and the sliding contact or the contact roller may be multipolar. A plurality of contact rings is arranged side by side in the multipolar contact roller on a shared roller body and are electrically isolated from one another. They may be insulated from each other, for example, by a respective disk or fence between two contact rings or contact paths. A disk or a fence can be arranged in a groove for guiding purposes. Sliding contacts may also be electrically insulated from one another by fences or disks arranged between them. Fences may be arranged in the handrail, if the grooves are part of the energy transfer element. Disks may be arranged in the energy transfer element, if the grooves are arranged in the handrail.

Alternatively, a portion of a non-contact power supply device for supplying the transmitter device may be integrated into the static handrail guide and another portion into the handrail.

A non-contact power supply device may comprise two compatible components, one of which is arranged on the handrail guide and the other in the handrail. The electrical energy can, for example, be transmitted inductively or electromagnetically. The electrical energy can be transmitted by induction or magnetic resonance using transmitting coils and receiving coils. The electrical energy can be transmitted optically by a light source and photoelectric converter. An inner side of the handrail may, for example, comprise receiving coils or photocells. The transmitting coils or the light source can be arranged in a subsection of the handrail guide. Likewise, a plurality of transmitting coils or a plurality of light sources can be distributed across a circumference of the handrail guide.

The transmitter device may comprise a plurality of individually controllable transmitters.

The transmitters can be similar. If individually controllable transmitters are used, energy can be saved, since only the transmitters that are actually needed are activated. If the transmitters are arranged at close distances to one another, the generated field of a charging area can be electronically influenced by adjacent transmitters jointly generating the field. The charging area can be moved by weakening or amplifying individual fields of adjacent transmitters. Then, the charging area can be moved independently of the transport speed.

The handrail may have markings that indicate the charging areas. Due to the markings, a passenger knows immediately upon entering the passenger transport system where a charging area for charging his mobile device is available. The markings may be symbols which are arranged, for example, on a visible side or upper side of the handrail and indicate the charging possibility. The markings may also, for example, be supplemented by instructions for use displayed on the handrail.

Furthermore, areas on the fixed balustrade or on pallets or steps may have markings indicating the charging zones. These markings draw the attention of the passengers to the charging possibility in general and to the charging areas in particular. This can be marked, for example, by means of a row of LED lights mounted on the balustrade, screen displays, lighting or simply by means of stickers. This also makes it possible to provide the instruction "stand on the left" and "walk on the right," which increases the safety of the passengers.

The mobile device charging device may have a display device for marking charging areas and/or charging zones.

The charging areas and/or charging zones can also be marked actively. The display device can be controlled to mark charging areas as needed. The display device preferably has controllable light sources. The display device can mark the charging areas, for example with graphically represented symbols. The light sources can be integrated into the handrail. Then, the light sources may be arranged, for example, in the form of the symbols. Alternatively, the display device can be arranged on the static handrail guide. In that case, the display device may have a matrix of controllable pixels. The light sources can be combined in an imager. The displayed symbols can be synchronously moved to the charging areas.

The display device may be configured to indicate to the mobile device at least one standby status of the charging area and/or a pairing status.

The display device may display different symbols. Different symbols may have different meanings. A change from a first icon to a second icon may, for example, indicate a successful pairing of a mobile device with the mobile device charging device. The display of another icon may indicate a failed pairing of the mobile device with the mobile device charging device.

The mobile device charging device may be integrated into the upright handrail assembly of the passenger transport system. In other words, the mobile device charging device may be provided only on one of the two handrail assemblies of the passenger transport system, on the side where passengers of the passenger transport system are supposed to stand, whereas no mobile device charging device needs to be provided on the other handrail assembly on the side where passengers of the passenger transport system are supposed to walk.

The mobile device charging device may alternatively be integrated on both sides of the passenger transport system, e.g, on both handrail assemblies, but be activated only on the standing side, in some embodiments.

The standing side can be understood as meaning a side of the passenger transport system on which the passengers stand in accordance with a customary convention (in Europe, for example, stand on the right and walk on the left). The other side of the passenger transport system can be referred to as the walking side. By reversing the transport direction, the standing side and the walking side can be interchanged, and the corresponding mobile device charging device can be activated.

By charging only on the standing side, the walking side can more easily be kept free of standing passengers. If it is the local custom that passengers stand on both sides of the passenger transport system, charging facilities may be offered or activated on both sides.

The mobile device charging device may include a data interface for communicating with the mobile device. The mobile device charging device can then communicate wirelessly with the mobile device via the data interface. The data interface can use a common communication protocol such as Bluetooth® and/or WLAN. The data interface can enable communication in both directions. Information about the surroundings may be provided by the mobile device charging device, for example. Thus, a floor plan, a station plan and/or a plan of the surrounding area can be transmitted to the mobile device. Likewise, for example, a schedule such as upcoming departure times of trains, trams and/or buses and/or start times of events in the area may be transmitted. Advertising from advertising partners can be provided. The mobile device can transmit a planned route and, in response thereto, route notifications, for example about blocked roads, may be provided.

The data interface may also be designed to exchange charging information with the mobile device. A type of the mobile device or the energy store accommodated therein can be called up via the data interface, for example. In response to the type, a maximum charging power of the mobile device charging device can be adjusted. A battery status of the mobile device can be transmitted. In response, the power and/or voltage of the charging power provided by the mobile device charging device can be regulated.

It should be understood that some of the possible features and advantages of the invention(s) are described herein with reference to different embodiments. A person skilled in the art will recognize that the features can be suitably combined, adapted or replaced in order to arrive at further embodiments of the application.

BRIEF DESCRIPTION OF THE DRAWINGS

Embodiments will now be described with reference to the accompanying drawings, but neither the drawings nor the description should be construed as limiting the application.

The figures are only schematic and not to scale. Like reference signs designate like or equivalent features in the various figures.

DETAILED DESCRIPTION

Escalators and moving walkways are walk-in passenger transport systems, which have a certain risk potential for the users due to the moving treads with respect to a fall. In escalators, the treads are formed on steps, with several steps being combined to form a rotatably arranged movable step belt. In moving walkways, the treads are formed on pallets, wherein several pellets are combined to form a rotatably arranged movable pallet belt. To counteract the risk of falling, the European standard EN115 stipulates, for example, that balustrades with moving handrails are to be provided on either side of the step belt or pallet belt. The moving handrails move approximately synchronously with the step belt or pallet belt so that a user can securely hold on to it.

It is important for safety reasons to hold onto the handrail, but the proliferation of mobile electronic devices such as cell phones, tablets, and the like, entice users to stare at their cell phones while on the moving walkway or escalator instead of holding onto the handrail. As soon as such users are pushed by passing persons and fall, their hands are so far away from the handrail that their hands can no longer grab the securing handrail.

The approach presented here offers passengers an incentive to hold onto the handrail or at least to keep the hand so close to the handrail that they are be able to grab it immediately in case of danger. To achieve this, a charging device for the wireless transmission of electrical energy can be integrated in the circumferential handrail or the handrail guide. The energy may be transmitted electromagnetically or optically. To control the charging process, the charging device may communicate with the mobile electronic device.

The handrail may have a plurality of charging stations arranged on its circumference, wherein these are internally connected to one another either electrically or optically. The energy may be electrically transmitted to the lines of the handrail via contact rollers and a contact track, which is arranged on the inside of the handrail profile. An optical transmission from the stationary part of the balustrade to the movable handrail is conceivable as well. Stationary charging devices extending across the length of the handrail guide are easier.

The handrail can have marked fields that alert passengers to the charging possibility so that users place their mobile device on the handrail while in transit. In the event of danger, they are then very quickly able to grab the handrail.

Figure 1:
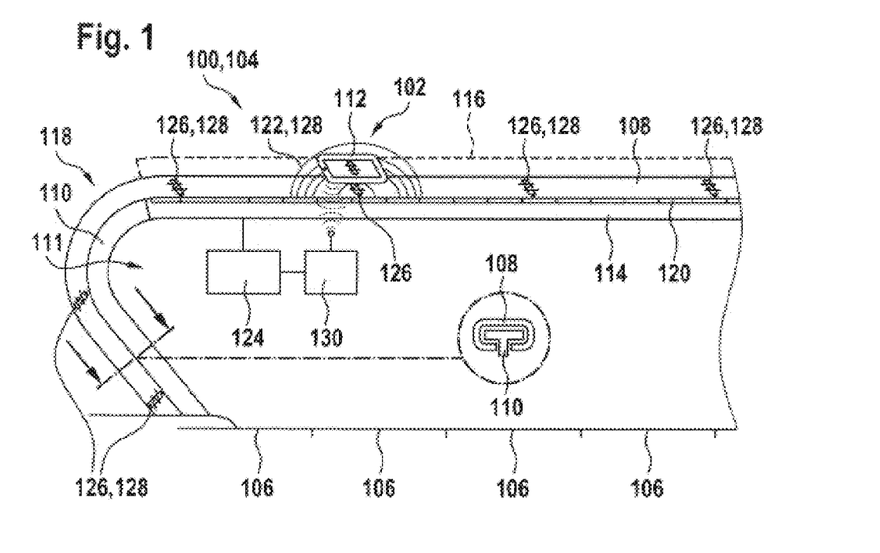
FIG. 1 shows a representation of a moving walkway with a mobile device charging device according to one embodiment.

FIG. 1 shows a representation of a moving walkway 100 with a mobile device charging device 102 according to one exemplary embodiment. In the illustrated embodiment, the moving walkway 100 is a walk-in passenger transport system 104, which continuously conveys in a transport direction in order to transport passengers in the transport direction. The moving walkway 100 comprises pallets 106, which are driven by a drive device of the moving walkway 100 and are rotatably arranged as a pallet belt. On both sides of the pallet belt or the pallets 106, the moving walkway 100 has a mobile handrail 108, which is driven substantially synchronously with the pallets 106, with only one being visible due to the two-dimensional representation chosen. A substantially flat bearing surface is provided on which passengers can stand or walk from an entry area of the moving walkway 100 to an exit area of the moving walkway 100. The pallets 106 are moved in the transport direction. After the exit area of the moving walkway 100, the pallets 106 are deflected and returned against the transport direction in the so-called return. The pallets 106 may, for example, be returned below the bearing surface accessible to passengers. At the end of the return, the pallets 106 are deflected back to the forward direction.

In the illustrated embodiment, the handrails 108 are endless belts or straps that synchronously rotate around handrail guides 110 together with the pallets 106. The handrails 108 are segmented, for example, or comprise an elastomeric material. The handrails may have a C-shaped cross-section, while the handrail guides have a T-shaped cross section. The handrail guides 110 may be integrated into opaque balustrades 111 of the moving walkway 100. Likewise, the handrail guides 110 can be arranged on transparent balustrades 111 of the moving walkway 100.

The mobile device charging device 102 is configured to wirelessly charge the mobile devices 112 of passengers when they are placed in the vicinity of a handrail 108. For this purpose, a transmitter device 114 of the mobile device charging device 102 for providing a charging zone 116 is integrated into at least one handrail assembly 118 of the moving walkway 100. The handrail assembly 118 comprises the handrail 108, the handrail guide 110, the opaque or transparent balustrade 111 and a drive for the handrail 108, not shown. In the illustrated example, the transmitter device 114 is integrated into the static handrail guide 110. As a result, the transmitter device 114 can easily be supplied with electrical energy.

The transmitter device 114 is configured to transmit electrical energy to the mobile devices 112 through an electromagnetic transmission. The energy can be transmitted, for example, by light, induction and/or magnetic resonance. The electrical energy can also be transmitted across a gap. In the present exemplary embodiment, the handrail 108 is arranged between the transmitter device 114 and the mobile device 112.

In one embodiment, the transmitter device 114 has a single transmitter 120 that extends across the length of the moving walkway 100. The transmitter 120 is configured to form a field 122 that extends across the length of transmitter 120 and through which electrical energy can be transmitted to the mobile device 112. Specifically, the transmitter 120 forms, for example, a static magnetic field, wherein the charging voltage required for charging the energy storage of the mobile device 112 is generated when the mobile device 112 is moved in the magnetic field.

In one embodiment, the transmitter device 114 has a plurality of transmitters 120 arranged along an upper side of the handrail guide 110. The transmitters 120 are configured to each form a field 122, for example an alternating field, via which the electrical energy can be transmitted to the mobile device 112. The transmitters 120 are individually controllable to allow the resulting field 122 to travel synchronously with the handrail 108 along the handrail guide 110. A transmitter controller 124 controls the individual transmitters 120 and synchronizes a movement speed of the field 122 with a transport speed of the moving walkway 100 or the handrail 108, respectively. The handrail 108 has markings 126 that identify the positions of potential charging areas 128. The markings 126 are distributed on the handrail 108 at regular intervals.

Furthermore, areas on the fixed balustrade 111 or on pallets 106 or steps 202 (see FIG. 2) may have markings indicating the charging zones 116. These markings draw the attention of the passengers to the charging possibility in general and to the charging areas 128 in particular. They can be marked, for example, by means of a row of LED lights mounted on the balustrade, screen displays, lighting or simply by means of stickers. For the sake of clarity, a representation of the markings for the charging zones 116 has been dispensed with in FIGS. 1 and 2.

In one embodiment, the markings 126 emit light. The light may be provided by light sources integrated in the markings 126. The light sources use electrical energy that is coupled into the handrail 108. The electrical energy can be provided, for example, by the transmitter device 114 and tapped into via antennas or coils. Alternatively, contact tracks on the handrail 108 may be connected to the light sources and contacted via sliding contacts or contact rollers on the handrail guide 110.

In one exemplary embodiment, at least one light guide which distributes the coupled light to the markings 126 is located in the handrail. Then, the light source can also be arranged in the handrail guide 110.

Alternatively, the markings 126 are afterglowing, that is to say phosphorescent, fluorescent or luminescent. The markings 126 are charged with light and light up at least at the entrance of the moving walkway 100. Over the course of the ride, the luminosity may diminish. The markings can be recharged by at least one light source at a location of the handrail guide 110 that is not visible to passengers. Alternatively or additionally, the markings 126 convert a UV component of an ambient light into visible light and thus appear brighter than only the visible portion of the ambient light. The W component may also be emitted by a lighting device of the passenger transport system 104. The ultraviolet light can also have a disinfecting effect on the handrail 108.

In one embodiment, the mobile device charging device 102 is configured to communicate with the mobile device 112. For this purpose, the mobile device charging device has a data interface 130 to the mobile device 112. Via a transmitting and receiving antenna, the data interface 130 can communicate with the mobile device 112 using a common communication protocol such as Bluetooth® or WLAN.

In one embodiment, the data interface 130 is connected to the transmitter controller 124. Charging information is exchanged with the mobile device 112 via the data interface 130. The charging information displays, for example, a charge status of a battery of the mobile device 112. The charging information can also specify charging modalities such as a maximum charging power. The activation and deactivation of the energy transmission may also take place via the data interface 130 by means of an identification query. This ensures that only rechargeable batteries of mobile devices 112 can be recharged and that other devices such as short-circuited windings, which could put vandals on the handrail 108, are not supplied with power.

Alternatively or additionally, further information about the mobile device 112 can also be transmitted via the data interface 130. A map of the surrounding area, arrival and departure times of public transportation in the vicinity, news, weather information, and/or information from cooperation partners may be transferred to the mobile device 112, for example. The time spent by passengers on the moving walkway 100 can thus be used to inform them. Shortly before the end of the travel, a warning may be transmitted to the mobile device 112 in front of a comb plate of the moving walkway 100, under which the pallets 106 disappear in the exit area.

Figure 2:
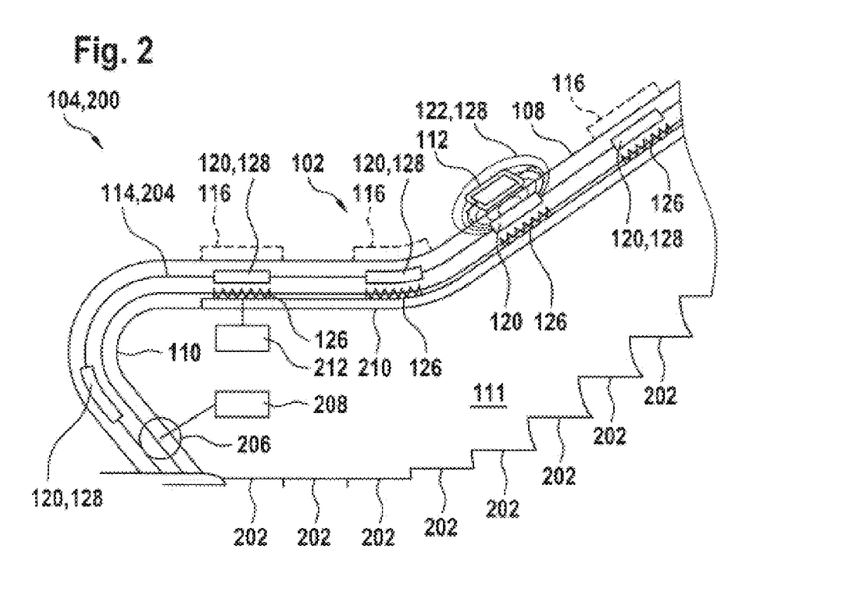
FIG. 2 shows a representation of an escalator with a mobile device charging device according to one exemplary embodiment.

FIG. 2 shows a representation of an escalator 200 with a mobile device charging device 102 according to a further exemplary embodiment. The escalator 200 is a continuously conveying passenger transport system 104 that can be walked on in a transport direction for transporting passengers. The escalator 200 comprises movable, driven steps 202 and, just as the moving walkway in FIG. 1, a balustrade 111 on each side with a movable handrail 108 driven substantially synchronously with the steps 202. The steps 202 are, similar to the moving walkway in FIG. 1, configured to form a flat surface in front of the entry area, arranged vertically in an offset manner, and then returned to a flat surface again in front of the exit area. After the exit area, the steps are diverted and returned, for example, in the return below in the direction of the entry area.

The mobile device charging device 102 substantially corresponds to the mobile device charging device in FIG. 1. In contrast, however, the transmitters 120 of the transmitter device 114 are arranged here in the handrail 108 and are moved together with the handrail 108 in the transport direction. In the illustrated embodiment, a transmitter 120 is assigned to every second step 202. The individual transmitters 120 are arranged at fixed distances from one another. The charging zone 116 is not continuous, but divided into many individual charging areas 128. In each case, one transmitter 120 is assigned to one charging area 128. The transmitters 120 are connected to each other in an electrically conductive manner. Contact tracks 204 run along an inner side of the handrail 108. Electrical energy is transferred from a static power supply device 208 to the contact tracks 204 via a power transmission element 206. Here, the energy transfer element 206 is configured as a plurality of individual contact rollers or a multipolar contact roller.

The power supply device 208 may transmit the electrical energy to the transmitters 120 wirelessly as well. The electrical energy can be transmitted inductively or electromagnetically. The electrical energy can be transmitted, for example, via at least one transmitting coil and at least one receiving coil. The electrical energy can also be transmitted optically by at least one light source and one photoelectric element.

In one embodiment, the handrail 108 is at least partially transparent. Under the handrail 108, a display device 210 is fixedly connected to the handrail guide 110. The display device 210 may include a simple light source for example an LED strip, and the markings 126 may be incorporated as transparent elements in the otherwise opaque handrail. Alternatively, the handrail may be largely transparent. The marking 126 of the individual charging areas 128 is created by the display device 210. For this purpose, the display device 210 can include a matrix of individually or groupwise-controllable light sources. The light sources are controlled by a display controller 212. Symbols and/or marked areas may be displayed on the display 210 in synchrony with the movement of the handrail 108.

In one embodiment, a status of the respective charging area 128 is signaled by the markings 126 on the display 210. A color and/or a shape of the symbol and/or marker area may be displayed according to the status. When a field 122 for charging a mobile device 112 is emitted, for example, the marking 126 of a charging area 128 may change from a rust color to a second color and/or change its brightness.

Figure 3:
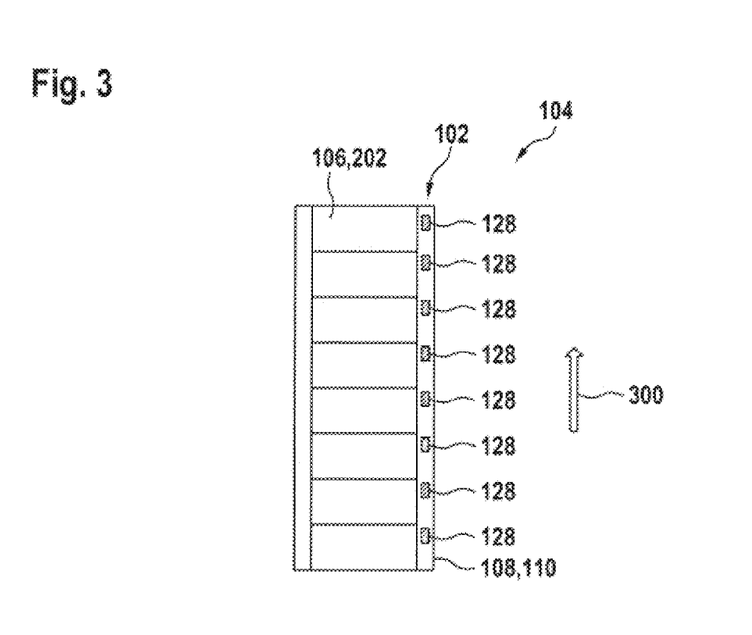
FIG. 3 shows a representation of a passenger transport system with a one-sided mobile device charging device according to one exemplary embodiment.

FIG. 3 shows a representation of a passenger transport system 104 having a one-sided mobile device charging device 102 according to one exemplary embodiment. The passenger transport system 104 may be an escalator as in FIG. 2 or a moving walkway as in FIG. 1. The transmitters of the mobile device charging device 102 may be integrated into the handrail guide 110 as in FIG. 1 or into the handrail 108 as in FIG. 2.

In the illustrated example, the mobile device charging device 102 is integrated into the side of the passenger transport system 104 on which the passengers usually stand. This side can be called the standing side. The side of the passenger transport system 104 on which the passengers pass by the standing passengers can be referred to as the walking side. In the embodiment shown here, there is no mobile device charging device 102 on the walking side.

In the present exemplary embodiment, a charging area 128 is arranged at the level of each step 202 or pallet 106. The charging areas 128 are arranged offset to the pallets 106 or steps 202 in the direction of the transport direction 300, thus providing the ideal hand position for quickly gripping the handrail 108 and stabilizing the stumbling passenger.

Figure 4:
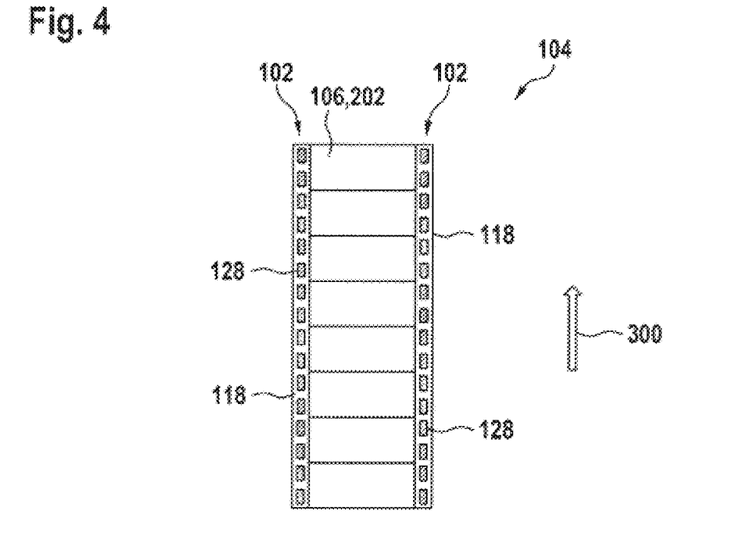
FIG. 4 shows a representation of a passenger transport system with a two-sided mobile device charging device according to one exemplary embodiment.

FIG. 4 shows a representation of a passenger transport system 104 having a mobile device charging device 102 on both sides according to one exemplary embodiment. The passenger transport system 104 essentially corresponds to the passenger transport system 104 in FIG. 3. Additionally, mobile device charging devices 102 are integrated into both handrail assemblies 118. The mobile device charging devices 102 may be activated in a direction-dependent manner. Here, four charging areas 128 are available per step 202 or pallet 106 in order to be able to satisfy the various preferences of the passengers.

Finally, it should be noted that terms such as "comprising," "including," etc., do not exclude other elements or steps, and terms such as "a" or "an" do not exclude a plurality. It must further be noted that features or steps which have been described with reference to one of the above

The invention claimed is:

1. A passenger transport system comprising:
an escalator or moving walkway comprising at least one handrail assembly, the at least one handrail assembly comprising a static handrail guide and a mobile handrail rotatably arranged around the handrail guide; and
a mobile device charging device, wherein, during a passenger transport, the mobile device charging device is configured for charging an energy storage of a mobile device of a passenger on the escalator or moving walkway, the mobile device charging device comprising a transmitter device integrated into the at least one handrail assembly and adapted to provide a charging zone for wirelessly transmitting energy to a mobile device in a vicinity of the handrail, wherein the mobile device is separate from the handrail.

2. The passenger transport system according to claim 1, wherein the transmitter device is integrated into the static handrail guide on which the mobile handrail is rotatably arranged.

3. The passenger transport system according to claim 2, further comprising at least one charging area for each of a plurality of mobile devices configured be moved along the charging zone at a transport speed of the passenger transport system.

4. The passenger transport system according to claim 3, wherein the handrail assembly comprises markings that identify the charging areas.

5. The passenger transport system according to claim 3, wherein the mobile device charging device comprises a display device for marking charging areas and/or charging zones.

6. The passenger transport system according to claim 5, wherein the display device is configured to display at least one standby status of the charging area and/or a pairing status to the mobile device.

7. The passenger transport system according to claim 1, wherein the transmitter device is integrated into the mobile handrail of the handrail assembly.

8. The passenger transport system according to claim 7, further comprising a power supply device for supplying the transmitter device, wherein the power supply device is integrated into the static handrail guide and comprises at least one power transmission element contacting the mobile handrail.

9. The passenger transport system according to claim 7, further comprising a non-contact power supply device for powering the transmitter device that is partially integrated into the static handrail guide and partially into the mobile handrail.

10. The passenger transport system according to claim 9, wherein the mobile device charging device comprises a data interface configured to communicate with the mobile device.

11. The passenger transport system of claim 10, wherein the data interface is configured to exchange charging information with the mobile device.

12. The passenger transport system according to claim 1, wherein the transmitter device comprises a plurality of individually controllable transmitters.

13. The passenger transport system according to claim 1, further comprising a balustrade, pallets, or steps, and wherein areas on the balustrade, the pallets, or the steps of the passenger transport system comprise markings identifying the charging zones.

14. The passenger transport system according to claim 1, wherein the mobile device charging device comprises a data interface configured to communicate with the mobile device.

15. The passenger transport system of claim 14, wherein the data interface is configured to exchange charging information with the mobile device.

16. A passenger transport system comprising:
an escalator or moving walkway; and
a mobile device charging device, wherein, during a passenger transport, the mobile device charging device is configured for charging an energy storage of a mobile device, wherein the mobile device charging device comprises a display device for marking charging areas and/or charging zones.

17. The passenger transport system according to claim 16, wherein the display device is configured to display at least one standby status of the charging area and/or a pairing status to the mobile device.

18. The passenger transport system according to claim 17, wherein the mobile device charging device comprises a data interface configured to communicate with the mobile device.

19. The passenger transport system of claim 18, wherein the data interface is configured to exchange charging information with the mobile device.

20. A passenger transport system comprising:
an escalator or moving walkway; and
a mobile device charging device, wherein, during a passenger transport, the mobile device charging device is configured for charging an energy storage of a mobile device, wherein the mobile device charging device comprises a data interface configured to communicate with the mobile device.

* * * * *

UNITED STATES PATENT AND TRADEMARK OFFICE
CERTIFICATE OF CORRECTION

PATENT NO. : 11,365,096 B2
APPLICATION NO. : 16/646950
DATED : June 21, 2022
INVENTOR(S) : Martin Kusserow et al.

It is certified that error appears in the above-identified patent and that said Letters Patent is hereby corrected as shown below:

In the Specification

In Column 1, Line 42, delete "on" and insert --on as--.

In Column 1, Lines 44-45, delete "Advantageous embodiments are provided throughout this disclosure." and insert the same on Column 1, Line 43, as a continuation of the same paragraph.

In Column 3, Line 45, delete "anus" and insert --areas--.

In Column 6, Line 49, delete "pellets" and insert --pallets--.

In Column 8, Line 67, delete "W" and insert --UV--.

In Column 10, Line 28, delete "rust" and insert --first--.

In the Claims

In Column 11, Claim 3, Line 27, delete "be" and insert --to be--.

Signed and Sealed this
Thirteenth Day of September, 2022

Katherine Kelly Vidal
*Director of the United States Patent and Trademark Office*